(12) United States Patent
Dorner et al.

(10) Patent No.: US 11,429,889 B2
(45) Date of Patent: Aug. 30, 2022

(54) EVALUATING UNSUPERVISED LEARNING MODELS

(71) Applicant: Amazon Technologies, Inc., Seattle, WA (US)

(72) Inventors: Charles Shearer Dorner, Seattle, WA (US); Robert Yuji Haitani, Seattle, WA (US); Sven Daehne, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 1494 days.

(21) Appl. No.: 15/595,866

(22) Filed: May 15, 2017

(65) Prior Publication Data

US 2018/0330270 A1 Nov. 15, 2018

(51) Int. Cl.
*G06N 20/00* (2019.01)
*G06Q 30/02* (2012.01)
*G06F 16/2458* (2019.01)
*G06Q 10/10* (2012.01)

(52) U.S. Cl.
CPC ......... *G06N 20/00* (2019.01); *G06F 16/2462* (2019.01); *G06F 16/2468* (2019.01); *G06Q 10/10* (2013.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 7,574,422 B2* | 8/2009 | Guan | ..... | G06Q 30/02 |
| 8,856,127 B2* | 10/2014 | Davids | ..... | G06F 16/84 |
| | | | | 707/737 |
| 9,336,546 B2* | 5/2016 | Nice | ..... | G06Q 30/02 |
| 2007/0244874 A1* | 10/2007 | Tawde | ..... | G06F 16/355 |

OTHER PUBLICATIONS

Ungar, Lyle H., and Dean P. Foster. "Clustering methods for collaborative filtering." AAAI workshop on recommendation systems. vol. 1. 1998. (Year: 1998).*
Karypis, George. "Evaluation of item-based top-n recommendation algorithms." Proceedings of the tenth international conference on Information and knowledge management. 2001. (Year: 2001).*

(Continued)

*Primary Examiner* — Daniel T Pellett
(74) *Attorney, Agent, or Firm* — Kilpatrick Townsend & Stockton LLP

(57) ABSTRACT

Techniques described herein include systems and methods for evaluating an unsupervised machine learning model. In some embodiments, the system identifies item-to-item similarity values based on historical transaction data. The system may also generate collection data for a number of users based on the historical transaction data. Similarity matrices may be created for each pair of users that include rows associated with a first collection and columns associated with a second collection. Each data field in the similarity matrix may indicate an item-to-item similarity value as identified by the system. In some embodiments, a similarity score may be calculated for the user pair based on the item-to-item similarity values included in the similarity matrix. In some embodiments, the system may generate a graphical summary representation of the similarity matrix.

16 Claims, 12 Drawing Sheets

(56) References Cited

OTHER PUBLICATIONS

He, Xiangnan, et al. "Neural collaborative filtering." Proceedings of the 26th international conference on world wide web. 2017. (Year: 2017).*

Hidasi, Balázs, et al. "Session-based recommendations with recurrent neural networks." arXiv preprint arXiv:1511.06939 (2015). (Year: 2015).*

Niemann, Katja, and Martin Wolpers. "A new collaborative filtering approach for increasing the aggregate diversity of recommender systems." Proceedings of the 19th ACM SIGKDD international conference on Knowledge discovery and data mining. 2013. (Year: 2013).*

Ekstrand et al., "Collaborative Filtering Recommender Systems", Foundations and Trends in Human-Computer Interaction, vol. 4, No. 2, Jan. 1, 2010, pp. 81-173.

Linden et al., "Amazon.com Recommendations Item-To-Item Collaborative Filtering", IEEE Internet Computing, Institute of Electrical and Electronics Engineers, vol. 7, No. 1, Jan. 1, 2003, pp. 76-80.

PCT/US2018/031949, "International Search Report and Written Opinion", dated Aug. 21, 2018, 13 pages.

Sarwar et al., "Item-Based Collaborative Filtering Recommendation Algorithms", ACM, 2 Penn Plaza, Suite 701 New York, NY 10121-0701 USA, Apr. 1, 2001, pp. 285-295.

* cited by examiner

FIG. 10

EVALUATING UNSUPERVISED LEARNING MODELS

BACKGROUND

Unsupervised machine learning algorithms are algorithms in which the machine learning task is to infer a function to describe hidden structure from "unlabeled" data (e.g., data for which a classification or categorization is not included in observations about the data). Since the data given to the system that uses the machine learning algorithm is unlabeled, there is often no efficient means of evaluating the accuracy of the structure that is output by a particular unsupervised machine learning algorithm.

BRIEF DESCRIPTION OF THE DRAWINGS

The patent or application file contains at least one drawing executed in color. Copies of this patent or patent application publication with color drawings will be provided by the office upon request and payment of any necessary fee.

These and other features, embodiments, and advantages of the present disclosure are better understood when the following Detailed Description is read with reference to the accompanying drawings.

FIG. 10 depicts a graphical user interface that may be presented by a service provider in accordance with at least some embodiments;

DETAILED DESCRIPTION

Figure 1:
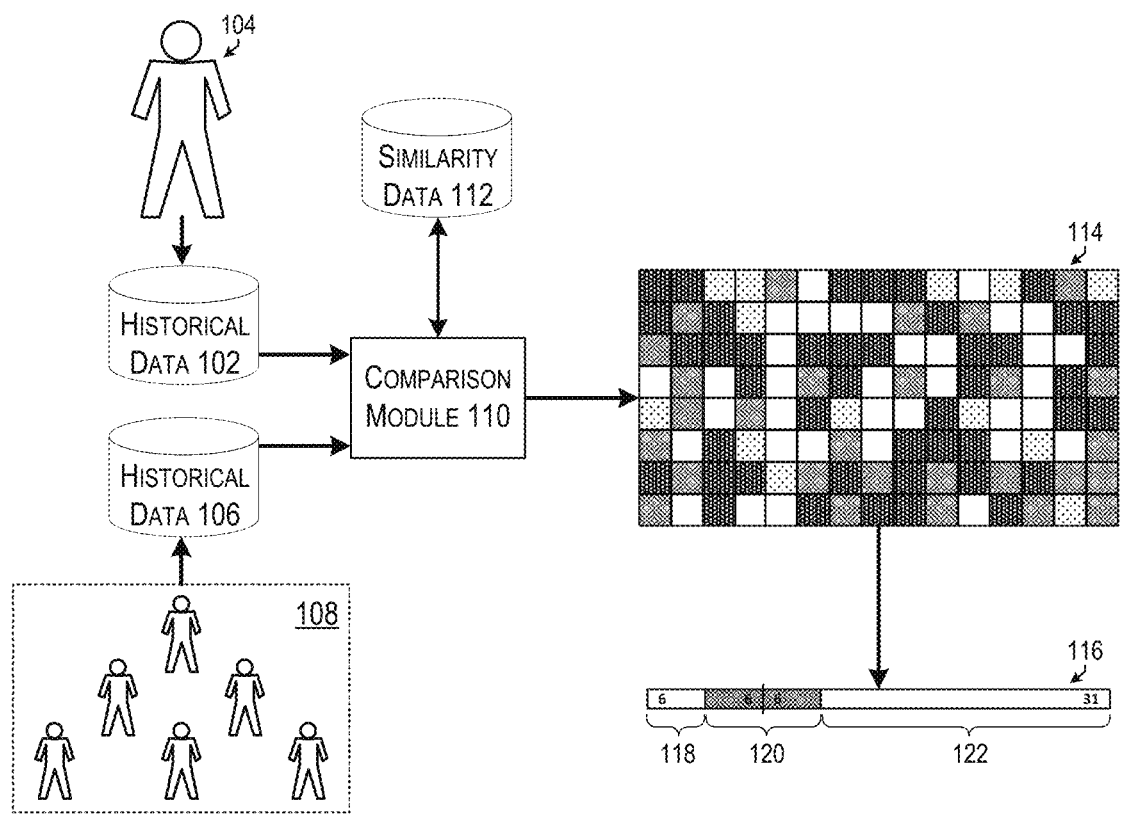
FIG. 1 depicts an illustrative example in which a similarity matrix may be generated along with a graphical summary representation depicting values associated with that similarity matrix.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include systems and methods for evaluating an unsupervised machine learning model. In particular, the techniques include a method of depicting result data obtained from a machine learning model in a way that enables quick determination of the efficacy of the machine learning algorithm. In some embodiments, the system described herein identifies item-to-item similarity values based on historical transaction data using one or more machine learning techniques. The system may also generate collection data for a user (e.g., a list of items owned by that user) based on the historical transaction data (e.g., purchase history data). Similarity matrices may be created for each pair of users that include rows associated with a first collection and columns associated with a second collection. Each data field in the similarity matrix may indicate an item-to-item similarity value as identified by the system. A similarity score may be calculated for the user pair based on the item-to-item similarity values included in the similarity matrix. In some embodiments, the system may generate a graphical summary representation of the similarity matrix that can be used to quickly identify several factors associated with the similarity matrix. In some embodiments, the system may be operated by an electronic retailer that maintains an electronic catalog of resources.

By way of illustrative example, a user may connect to a webpage maintained by a service provider that performs at least a portion of the functionality described herein. In this example, the user may be provided with a list of users which have similar shopping habits to him or her by the service provider. In addition, the user may be provided with a list of items that the user has the similar user does not, a list of items that both users have, and a list of items that the similar user has but the user does not. This may give the user the chance to see what others similar to him or her are buying that he or she may be interested in. Additionally, the user may be provided with a similarity matrix, similarity score, and/or graphical representation summary that shows how similar the users are. It should be noted that the users can be shoppers looking for potentially interesting items, or they can be machine language algorithm designers attempting to assess the validity of particular algorithm design choices such as similarity measures and/or similarity metrics.

By way of a second illustrative example, users may visit a website associated with a doctor or other health care professional. In this example, the user may select symptoms (which may be items) that he or she is exhibiting. In some embodiments, the user may select from a list of symptoms. In some embodiments, the user may provide textual input (either structured textual input or unstructured textual input) and the user's symptoms may be identified from that textual input. Once the user's symptoms have been identified, those symptoms may be stored as a collection. The user may then be compared to other users that have displayed various symptoms, either currently or in the past, to draw comparisons between users. In this example, the user may be diagnosed based on diagnoses provided for similar users by using a similarity matrix and/or summary representation as described herein.

It should be noted that although two particular examples are described here, the system and techniques may be utilized in any scenario in which comparisons are drawn between users. In various scenarios, items may represent any attributes associated with a user or users. Accordingly, the system described herein may be used in any suitable scenario in which a similarity between various users is to be determined and the disclosure is not intended to be limited to the examples described herein.

In some embodiments of the described system, in order to generate the list of users which have similar shopping habits to a particular user, the service provider may generate item-to-item similarity data using historical transaction data. This may involve the use of a machine learning algorithm. The service provider may also identify each of the transactions conducted by a particular user and compile a list of items (e.g., a collection) that the user owns based on the identified transactions. That list of items may then be compared to lists of items owned by other users using the item-to-item similarity values to identify users that are similar.

FIG. 1 depicts an illustrative example in which a similarity matrix may be generated along with a graphical summary representation depicting values associated with that similarity matrix. In some embodiments, the similarity matrix may be generated using one or more machine learning algorithms. In some cases, the similarity matrix may be generated using at least one unsupervised machine learning algorithm.

In the example system depicted in FIG. 1, historical data 102 associated with a first user 104 may be compared to historical data 106 associated with a number of other users 108 to identify users with similar preferences to the first user 104. To do this the system described herein may use a comparison module 110 to compare transactions conducted by the first user 104 to transactions conducted by each of the users in the plurality of users 108 in order to estimate a level of similarity between the first user 104 and each of the users in the plurality of users 108. A level of similarity between two users may be determined based on a level of similarity between items (e.g., goods or services in an electronic catalog) associated with each of the transactions that various users have conducted. For example, the system may compare transactions for various items in the historical data 102 to transactions for other items in the historical data 108 in order to detect a level of similarity between the items (e.g., co-purchases of two items). These relationships may be stored within a data store containing similarity data 112. Once a level of similarity has been identified between two users, a similarity matrix 114 may be generated depicting similarities between a number of items included in each of the users' collections. A summary representation 116 of the similarity matrix may then be presented, which enables quick assessment of the similarity matrix 114.

In accordance with at least some embodiments, historical data 102 and 106 may include data related to transactions conducted by the user 102 and users 108 respectively. For example, the historical data 102 and 106 may include data related to items that have been interacted with (e.g., purchased, viewed, or rated) by each user. The historical data may also include an indication of a date/time at which the user interacted with the item and/or a rating that the user assigned to the item.

In accordance with at least some embodiments, a comparison module 110 may be any set of computer-executable instructions configured to cause a processor to identify similarities between users based on similarity data 112 and historical data associated with those users (e.g., historical data 102 and 106). To do this, the comparison module 110 may identify a number of transactions conducted by both the first user 104 and at least one second user in the plurality of users 108. Once identified, the comparison module 110 may identify items associated with each of the identified transactions. The comparison module 110 may then determine a level of similarity between each of the items identified for the first user 104 and each of the items identified for the second user, which may be used to generate a similarity matrix 114 which is particular to those two users. The similarity values identified for each of the items may then be used to determine an overall similarity score for the two users.

In accordance with at least some embodiments, similarity data 102 may include information indicating a level of similarity between two items. A value representing a level of similarity may be assigned to a relationship between two items based on a correlation between transactions conducted for the first item and transactions conducted for the second item. For example, the system may be configured to increment a value representing a level of similarity for two items each time that the system detects that the two items have both been purchased by the same user. In another example, the system may increment a value representing a level of similarity for two items upon detecting that a first item has been purchased by a first user and a second item has been purchased by a second user which is similar to the first user. Similarity data 102 may be generated using one or more machine learning algorithms (e.g., an unsupervised machine learning algorithm as described above). There are a number of ways in which items may be determined to be similar. For example, the system may determine that the items are visually similar (e.g., share certain visual features). In another example, the system may determine that text associated with the items (e.g., descriptions of the item, reviews of the item, etc.) may contain similar words/phrases. In yet another example, the items may be similar in that they are typically interacted with under similar circumstances.

In accordance with at least some embodiments, similarity matrix 114 may include representations of similarities between various items associated with each of two users. In some embodiments, the rows of the similarity matrix 114 may represent items in a collection associated with the first user whereas the columns of the similarity matrix 114 may represent items in a collection associated with the second user. Each field in the similarity matrix may depict a level of similarity between the items in the respective row and column. In some embodiments, the level of similarity may be depicted as a color and/or gradient associated with a range of similarity values. For example, an exact match (i.e., the items are actually the same item) may be represented by a first color, a close match may be represented by various grades of a second color (depending on closeness), and a distant match may be represented by various grades of a third color (depending on distance). Some examples of various similarity matrices are described in greater detail below with respect to FIG. 7-FIG. 9.

In accordance with at least some embodiments, a summary representation 116 of the similarity matrix 114 may be presented to enable quick assessment of the similarity matrix 114. In some embodiments, the summary representation 116 may be a multi-segmented representation of the similarity matrix 114. For example, a first segment 118 may represent items which are unique to a first user's collection, a second segment 120 may represent an overlap between the first user's collection and a second user's collection, and a third segment 122 may represent items which are unique to the second user's collection. In this way, the resulting similarity matrix 114 may be quickly assessed to determine the efficacy of one or more machine learning algorithms used to generate the similarity matrix 114 (e.g., an unsupervised machine learning algorithm used to generate similarity data 112.

Machine learning algorithms may include supervised learning algorithms (e.g., algorithms in which input data has a known label or result) and unsupervised learning algorithms (e.g., algorithms in which input data is not labeled and does not have a known result). In supervised learning, a model is prepared through a training process in which it is required to make predictions and is corrected when those predictions are wrong (using the known result data). The training process continues until the model achieves a desired level of accuracy on the training data, at which point it may be applied to unknown data. In unsupervised learning, a model is prepared by deducing structures present in the input data. This may be used to extract general rules, which may be through a mathematical process to systematically reduce redundancy or to organize data by similarity. A number of types of machine learning algorithms (both supervised and unsupervised) are known to one skilled in the art. Some examples of such machine learning algorithms may include regression algorithms, instance-based algorithms, regularization algorithms, decision tree algorithms, Bayesian algorithms, clustering algorithms, association rule learning algorithms, artificial neural network algorithms, deep learning algorithms, dimensionality reduction algorithms, ensemble algorithms, and any other suitable algorithms.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications protocol.

Figure 2:
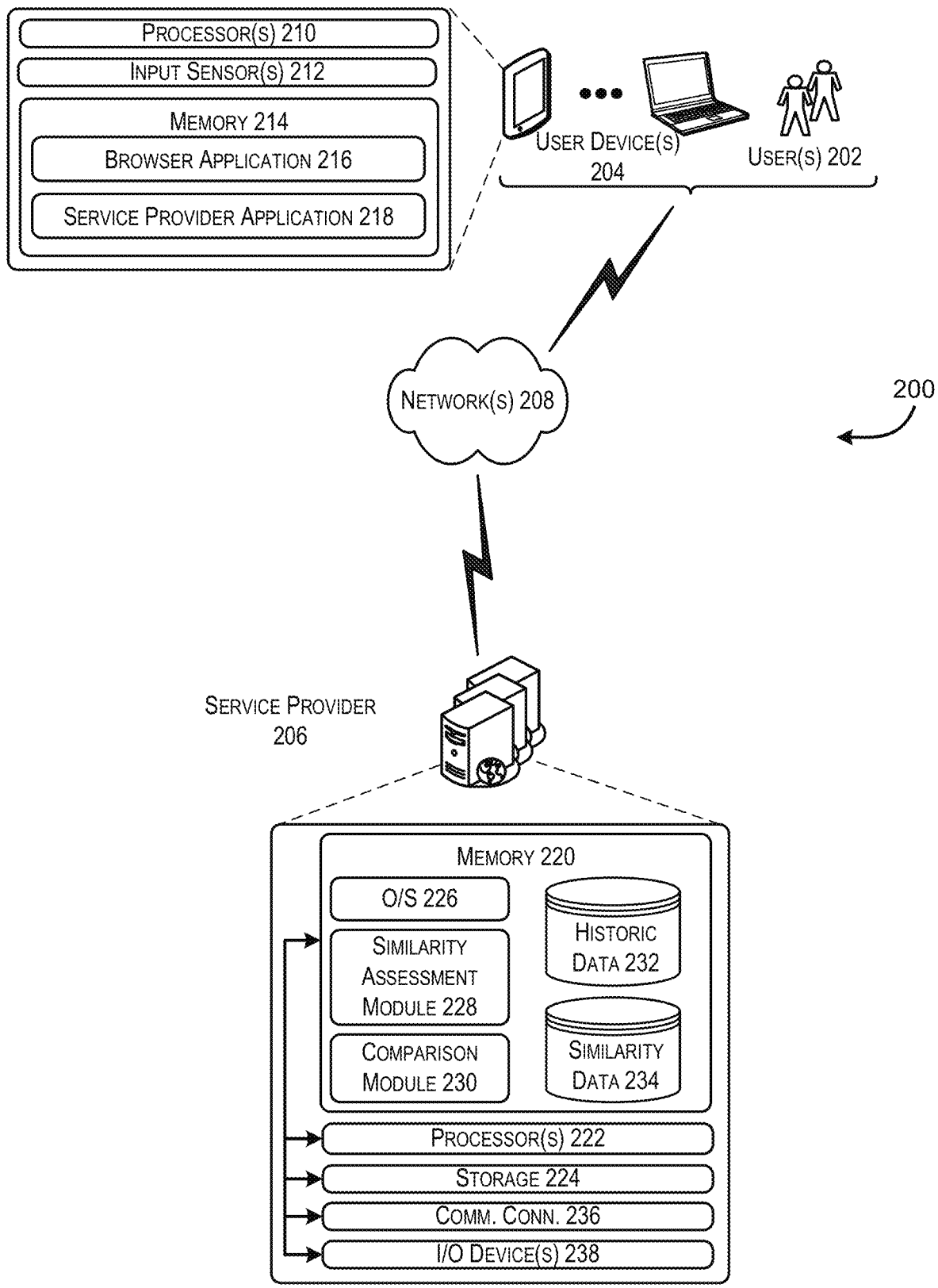
FIG. 2 depicts an illustrative example of a system or architecture 200 in which results for unsupervised learning may be depicted in accordance with some embodiments.

FIG. 2 depicts an illustrative example of a system or architecture 200 in which results for unsupervised learning may be depicted in accordance with some embodiments. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include a service provider application 218 that is capable of providing input received from a user of the user device 204 to the service provider 206 and receiving/presenting information received from the service provider 206 to the user. Although sample architecture 200 depicts a service provider application 218 as being included in the contents of the memory 214 of the user device 204, some embodiments may not include a service provider application 218 in memory 214 of the user device 204. In those embodiments in which the service provider application 218 is not included in memory 214, the functionality described with respect to the service provider application 218 may be provided via the browser application 216 in communication with the service provider 206. For example, the browser application 216 may be used to communicate with a network page maintained by the service provider 206 and to present information provided by the service provider 206 via a graphical user interface (GUI) associated with the browser application 216.

As described briefly above, the browser application 216 may allow the users 202 to interact with a service provider 206, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider application 218 may be any set of computer-executable instructions that causes the processors 210 to perform functionality as described herein. In some embodiments, the service provider application 218 may be a special-purpose application configured to enable communication between the user 202 and the service provider 206. For example, the service provider application 218 may be configured to receive input from the user 202 and relay that input to the service provider 206 as well as to cause information received from the service provider 206 to be presented to the user 202 via a GUI of the service provider application 218 implemented on the user device 204. In some embodiments, a user 202 may be required to log into an account maintained by the service provider 206 with respect to that user 202 via the service provider application 218 in order to access at least some functionality.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

The service provider 206 may be any type of computing device capable of executing the functionality described herein, such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for determining a level of similarity between various items in an electronic catalog (similarity assessment module 228), and/or a module for determining a level of similarity between various users based on historical transactions related to items in an electronic catalog (comparison module 230). The memory 220 may also contain historic data 232, which includes data related to various interactions between each of a plurality of users and each of a plurality of items. The memory 220 may also contain similarity data 234, which includes values representing a level of similarity between each of a number of items. In some embodiments, the historic data 232 and/or similarity data 234 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 236 that allow the service provider 206 to communicate with a stored database, another computing device or server, user terminals, and/or other devices on the network(s) 208. The service provider 206 may also include input/output (I/O) device(s) and/or ports 238, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing historic data 232, a database containing similarity data 234, and the one or more application programs or services for implementing the features disclosed herein, including a similarity assessment module 228 and/or a comparison module 230.

In some embodiments, the similarity assessment module 228 may be configured to generate similarity data 234. To do this, the similarity assessment module 228 may be configured to analyze historical data 232 and, for each pair of items in an electronic catalog, generate values that represent a level of similarity between those items. In some embodiments, the similarity assessment module 228 may be configured to generate values with respect to items that fall within a particular category or classification. The similarity assessment module 228 may utilize one or more machine learning algorithms to generate a value representing a level of similarity between each pair of items in an electronic catalog. For example, the similarity between two items may be determined based on a number of times that the items are each purchased by the same user and/or based on other patterns identified with respect to item similarity.

In some embodiments, the comparison module 230 may be configured to receive data from the service provider application 218 and identify users similar to the one from which the data has been received. To do this, the comparison module 230 may be configured to identify transactions associated with various users in the plurality of users. Once the comparison module 230 has identified a number of transactions for each user, the comparison module 230 may generate a collection associated with each user. A collection may be any set of items with which the user has previously interacted. For example, a collection may include all of the items that a user has previously purchased or otherwise owns. The comparison module 230 may identify a level of similarity between various users based on their respective collections and based on the similarity data 234 generated by the similarity assessment module 228.

Figure 3:
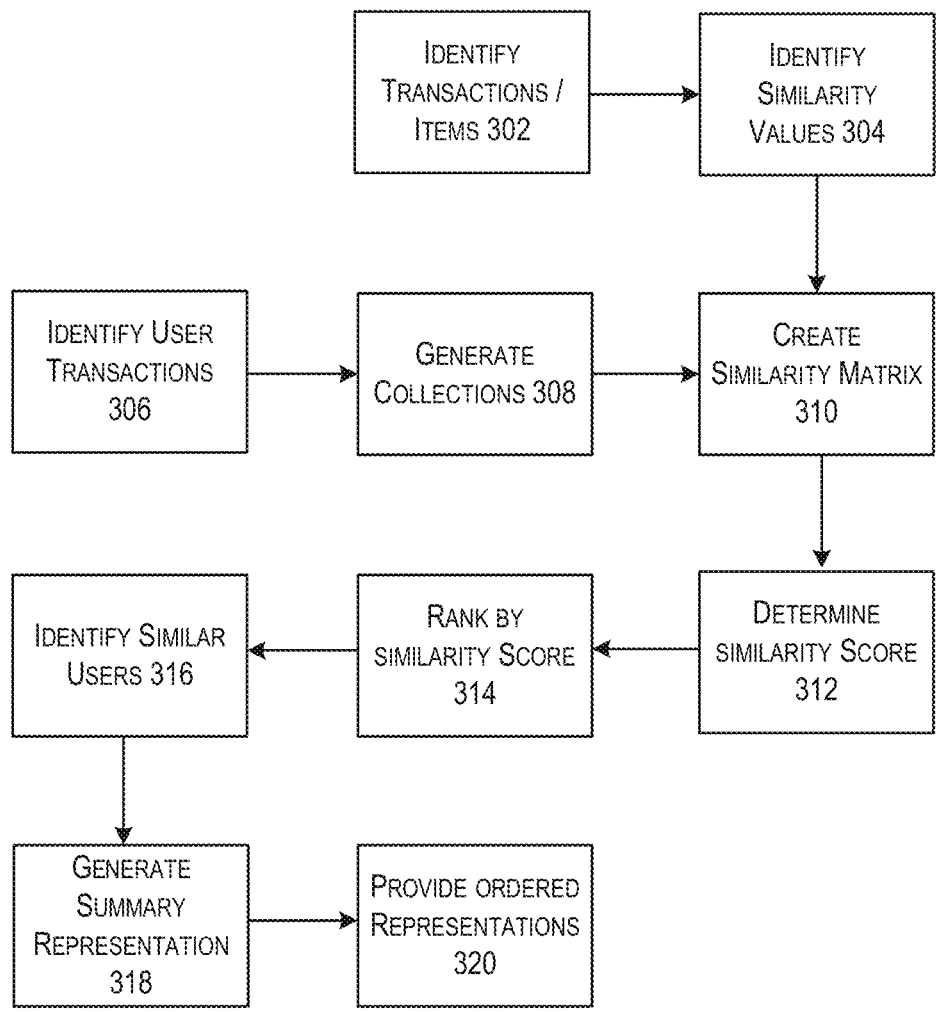
FIG. 3 depicts an illustrative data flow diagram demonstrating an example process for generating similarity matrices in accordance with at least some embodiments.

FIG. 3 depicts an illustrative flow chart demonstrating an example process for generating similarity matrices in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory.

Process 300 may begin at 302, when the service provider identifies a number of transactions from historical transaction data. Historical transaction data may be an example of historical transaction data 232 depicted in FIG. 2. As described above, a transaction may be any interaction between a user and an item. For example, a transaction may include a user purchasing an item or viewing a webpage associated with the item. In some embodiments, the service provider may identify multiple transactions occurring with respect to individual users. For example, the service provider may identify a number of purchases that have been made by the same user involving a number of different items.

At 304, the service provider may generate similarity values to be associated with each pair of two items, wherein the similarity values represent a degree of similarity between the two items. For example, items purchased by a single user may be determined to be similar by virtue of each item being co-purchased. In some embodiments, the service provider may determine a level of similarity based on correlations between item interactions. For example, the service provider may identify similarities in the circumstances under which items are interacted with. In some embodiments, the value representing the similarity between items may be negative, meaning that the items have a negative correlation (e.g., users who transaction for one of the items generally prefer not to transact for the other item). The generated similarity values may be stored in a database of similarity data, which may be an example of similarity data 234 depicted in FIG. 2.

In some embodiments, steps 302 and 304 may be performed on a periodic basis. For example, steps 302 and 304 may be performed on a daily basis to update the database of similarity data. In some embodiments, similarity data may be updated dynamically as new transaction information is received. For example, as a new transaction is conducted, item similarities may be identified based on that conducted transaction. In this example, the similarity data may be updated upon identifying those item similarities.

Once the similarity data has been generated, the service provider may identify a number of user transactions at 306. In some embodiments, the service provider may query the historical data for transactions grouped by user. Based on the response to the query, the service provider may generate a number of collections to be associated with various users at 308. In some embodiments, collections may only include items that the user has purchased or otherwise indicated that he or she owns. For example, the user may rate an item and while rating the item, select an option indicating that he or she owns the item. In this example, the item may be added to a collection associated with the user.

At 310, the service provider may generate a similarity matrix based on the identified user similarities for each pair of users. The similarity matrix may include representations of items associated with a first collection being associated with rows of the similarity matrix and representations of items associated with a second collection being associated with columns of the similarity matrix. Each field of the similarity matrix may represent a level of similarity between the items associated with the respective row and column which intersect at the field. In particular, each field may be associated with the similarity value associated with that pair of items obtained from similarity data 234. In some embodiments, the field may be assigned a color and/or gradient based on the similarity value.

At 312, the service provider may determine an overall similarity score for each pair of users based on similarities between the two users' respective collections. In some embodiments, an overall similarity score may be calculated as an average level of similarity associated with each field of the similarity matrix. For example, the overall similarity score may be calculated by summing up the similarity values associated with each field in the similarity matrix and dividing that sum by the number of fields in the matrix. In some embodiments, the overall similarity score may be determined based on a percentage of items shared between the two collections related to the similarity matrix. It should be noted that although specific examples are illustrated, any suitable method for calculating an overall similarity score may be utilized by the service provider.

At 314, the service provider may rank the user pairs based on the overall similarity score. In some embodiments, the service provider may, with respect to a particular user, order a number of user pairs based on their similarity to that particular user. For example, the service provider may order the user pairs from highest similarity score to lowest similarity score for the particular user. The service provider may also identify the user pairs having a particular user that have the highest similarity score as being similar to that particular user at 316. For example, the service provider may maintain the twenty user pairs having the highest similarity score for a user as users which are similar to that user. In some embodiments, the service provider may maintain a predetermined number of user pair with respect to a particular user.

At 318, the service provider may generate summary representations based on the similarity matrix. The summary representation may be a multi-segmented representation of the similarity matrix. For example, a first segment may represent items which are unique to a first user's collection, a second segment may represent an overlap between the first user's collection and a second user's collection, and a third segment may represent items which are unique to the second user's collection. In some embodiments, the multi-segmented summary representation may also be associated with a color and/or gradient as depicted in the similarity matrix.

At 320, the service provider may provide a number of summary representations associated with user pairs based on the determined rank for those user pairs. To do this, the service provider may map each of the ranked user pairs to a respective summary representation associated with that user pair. In some embodiments, a user may log into an account with the service provider. A list of the summary representations may then be presented to that user in order to provide an overview of user similarities. In some embodiments, the list may be provided in such a way that a user is able to click on, or otherwise select, a summary representation in order to expand the amount of information presented with respect to that user pair.

Figure 4:
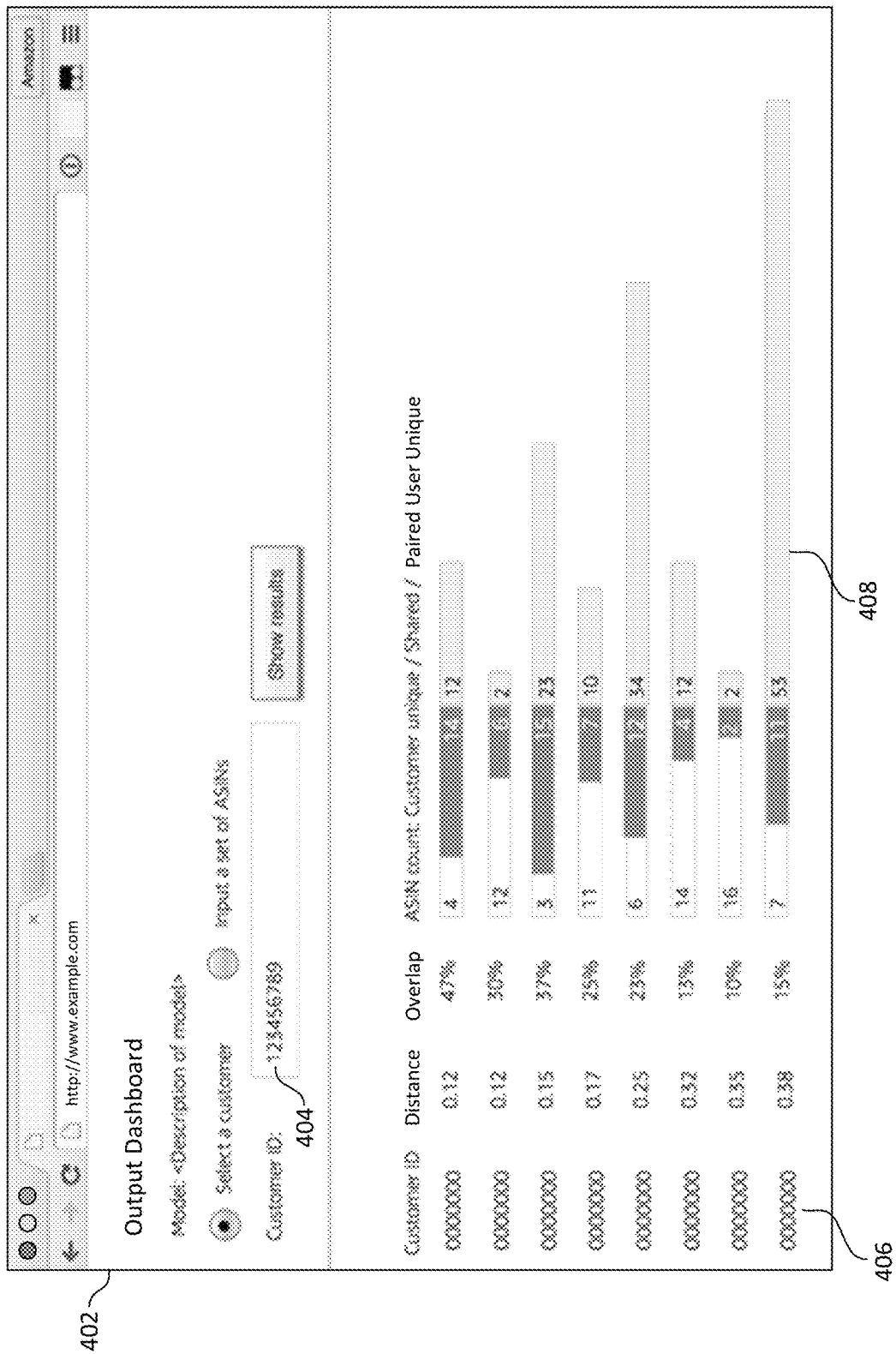
FIG. 4 depicts an illustrative example of an output dashboard that may be implemented by a service provider in accordance with at least some embodiments.

FIG. 4 depicts an illustrative example of an output dashboard that may be implemented by a service provider in accordance with at least some embodiments. In some embodiments, the depicted output dashboard may be implemented in a webpage 402 hosted by the service provider (e.g., the service provider 206 described above with respect to FIG. 2) and accessed via a browser application. In some embodiments, the depicted output dashboard may be presented via a service provider application (e.g., a mobile application installed on a mobile device).

In some embodiments, a user may be required to log into an account maintained by the service provider in order to access the depicted output dashboard. In some embodiments, a user may enter a user identifier 404 into a text input field in order to obtain similarity data for that user. The user identifier 404 may be random, or otherwise unrelated to the user, in order to maintain anonymity of various users of the system. For example, upon enrollment of a user of the system, the user may be assigned the next available identifier in a list of available identifiers.

Upon receiving a request to display user similarity data with respect to a particular user, the service provider may present a list of user pairs that include that user. In some embodiments, these user pairs may be ordered based on an overall similarity score associated with the user pair. In some embodiments, the service provider may only list a predetermined number of user pairs. For example, the user pairs presented to the user may be limited to the ten user pairs having the highest overall similarity score.

In some embodiments, each user pair may include an indication of a second user identifier 406 which is associated with a second user in the pairing, various metrics associated with the pairing, as well as a summary representation 408. As depicted, the summary representation 408 may include a number of segments that each represent various attributes of the pairing.

Figure 5:
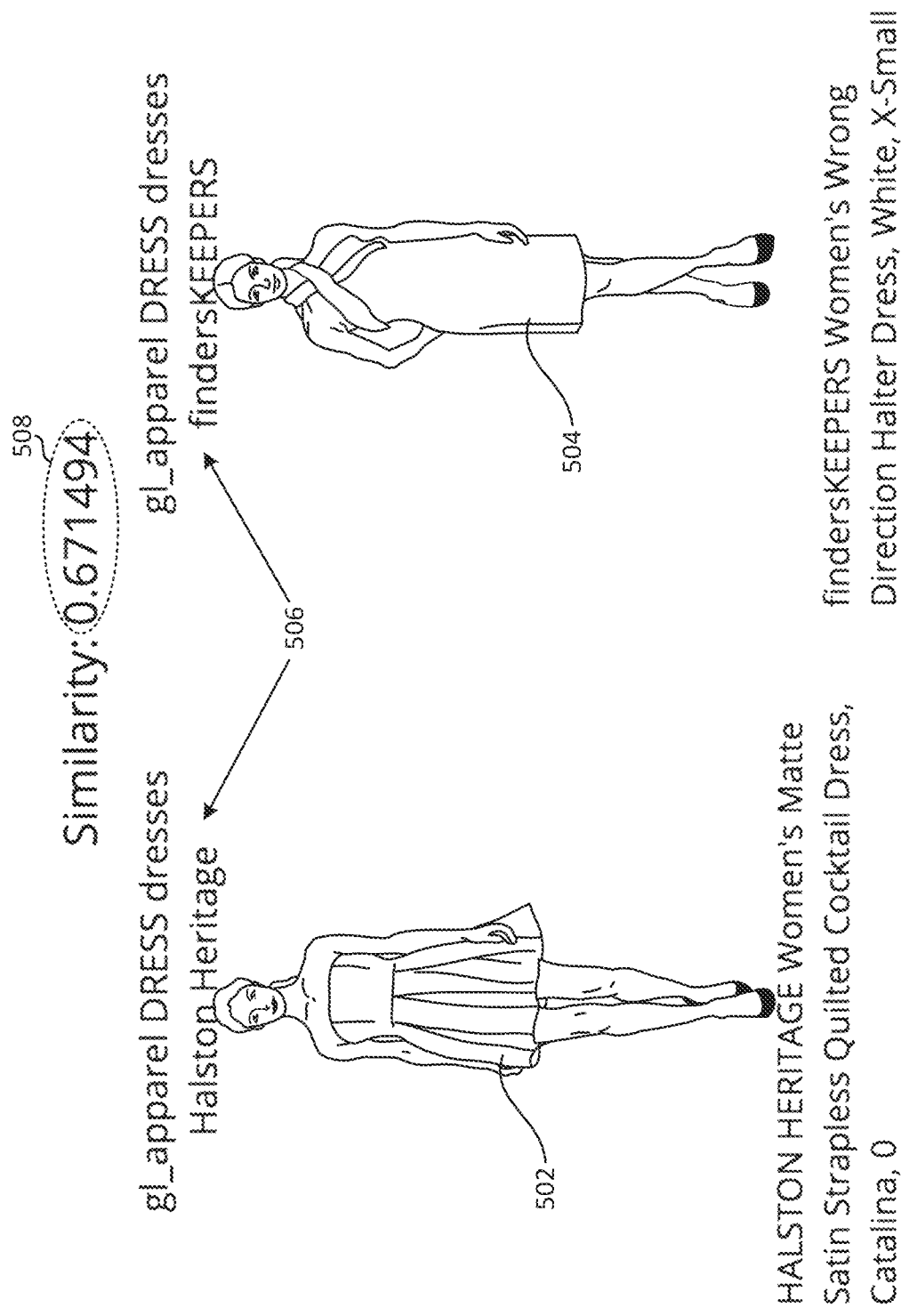
FIG. 5 depicts an illustrative example of a similarity score that may be calculated with respect to a pair of items in accordance with at least some embodiments.

FIG. 5 depicts a first illustrative example of a similarity score that may be calculated with respect to a pair of items in accordance with at least some embodiments. In FIG. 5 is depicted a representation of a first item 502 and a second item 504. Each of the items 502 and 504 may be given a classification 506 based on one or more characteristics of the item. In this illustrative example, the service provider may determine a similarity value 508 using one or more machine learning algorithms based on characteristics of the items and/or transactions that involve the items. In this illustrative example, the similarity value for an item may be calculated such that it is a value between −1.0 and 1.0.

Figure 6:
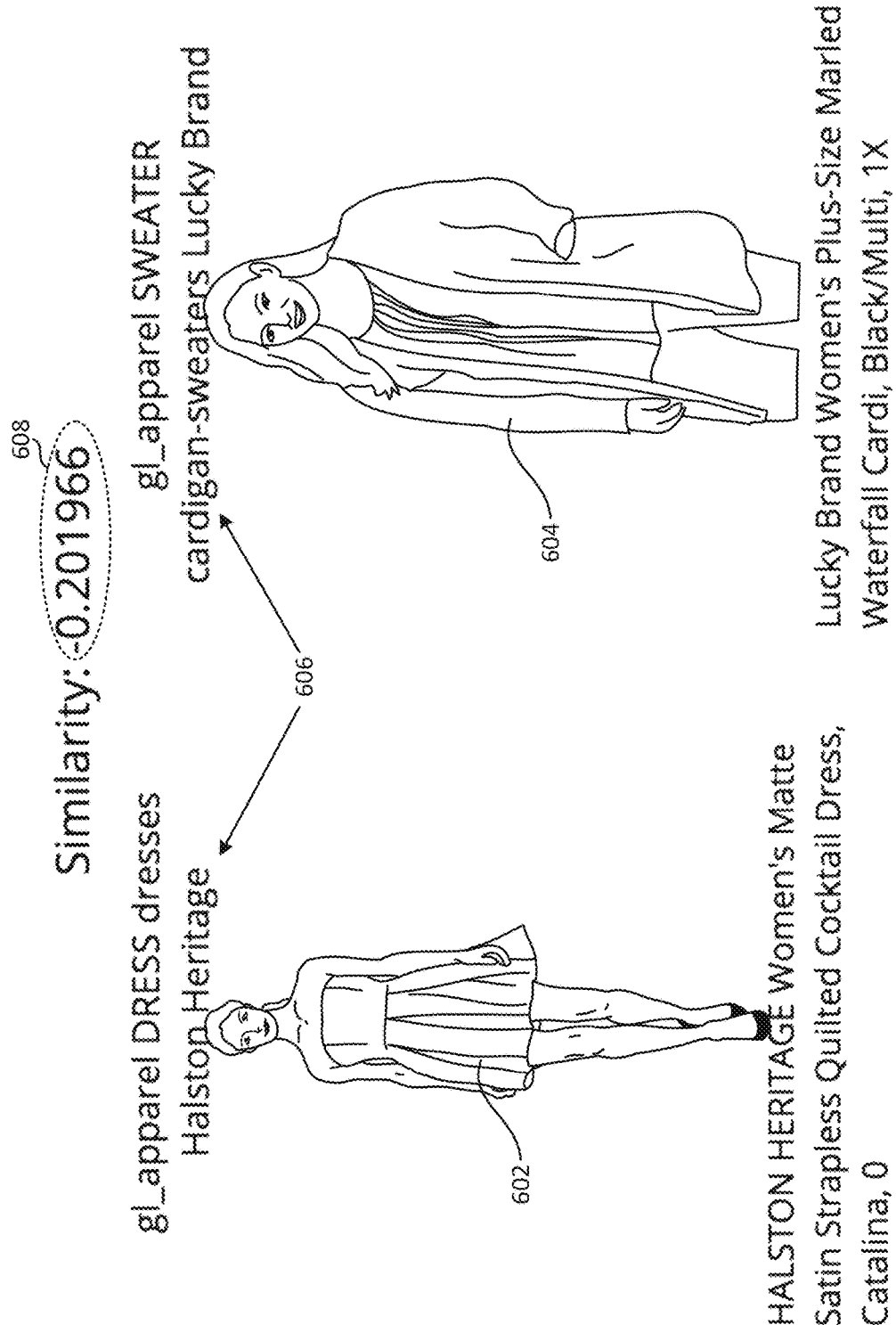
FIG. 6 depicts another illustrative example of a similarity score that may be calculated with respect to a pair of items in accordance with at least some embodiments.

FIG. 6 depicts a second illustrative example of a similarity score that may be calculated with respect to a pair of items in accordance with at least some embodiments. In FIG. 6 is depicted a representation of a first item 602 and a second item 604. Similar to the example illustrated in FIG. 5, each of the items 602 and 604 may be given a classification 606 based on one or more characteristics of the item. In this illustrative example, however, the service provider may calculate a negative similarity value 608 for the items 602 and 604 upon determining that the two items are negatively correlated.

Figure 7:
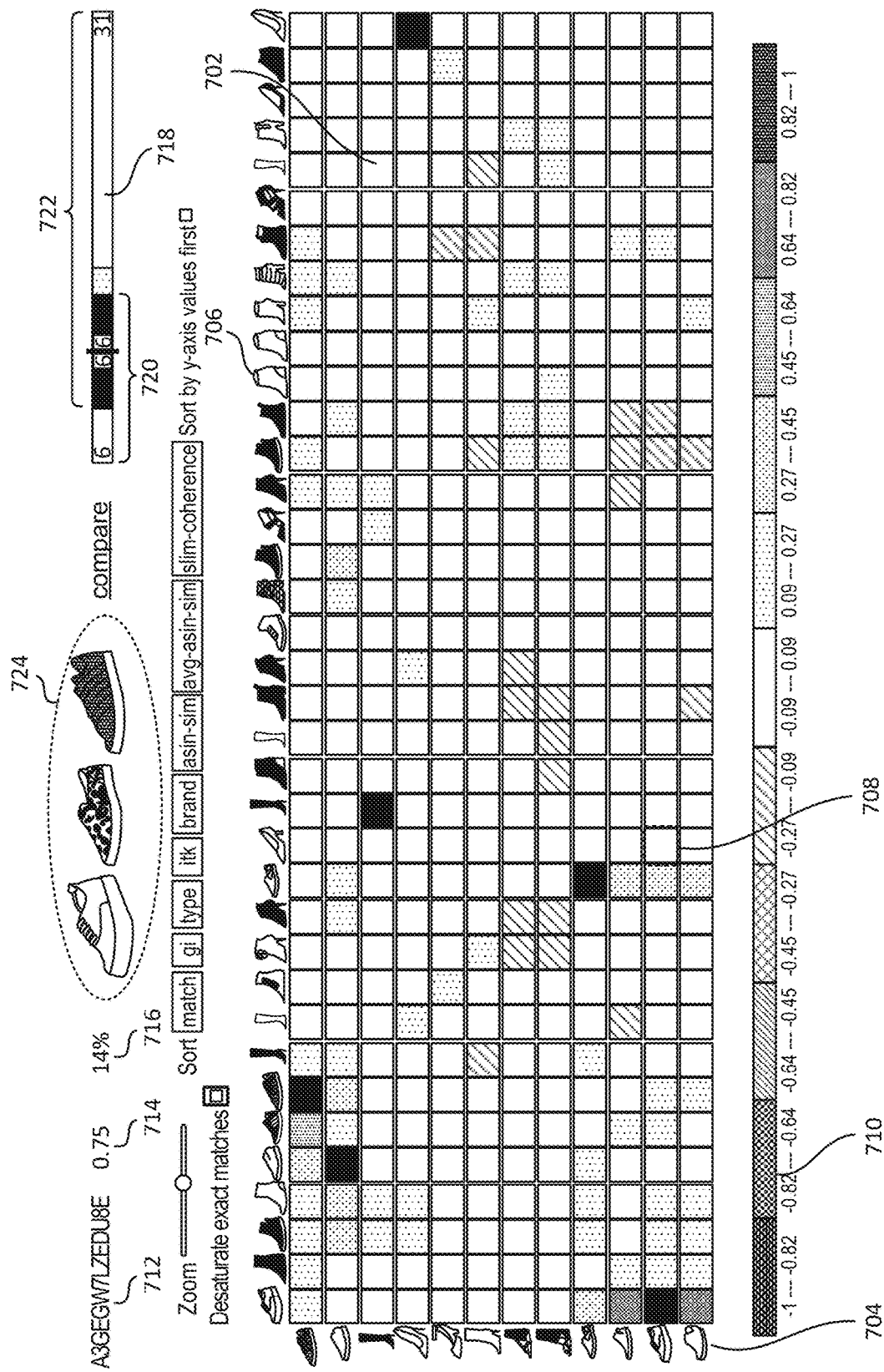
FIG. 7 depicts an illustrative example of a similarity matrix that may be implemented in accordance with at least some embodiments.

FIG. 7 depicts a first illustrative example of a similarity matrix that may be implemented in accordance with at least some embodiments. In order to illustrate features of the disclosure, FIG. 7 is executed in color. The similarity matrix 702 depicted in FIG. 7 is associated with a first user and a second user and is confined to a particular category of items (e.g., shoes). In this example similarity matrix, the rows 704 of the similarity matrix represents the shoes owned by the first user and the columns 706 of the similarity matrix represent the shoes owned by the second user.

In some embodiments, each data field 708 of the similarity matrix 702 may be associated with a similarity value assigned to an item pair that includes the item of the row 704 and the item of the column 706 that intersects at the data field 708. Based on that similarity value, the data field may be assigned a color and/or gradient associated with a range of values within which that similarity value falls. A legend 710 may be presented with the similarity matrix that enables a user to quickly determine how similar the system has determined the two items to be. To use the legend, the user may identify a particular data field 708 that he or she is interested in assessing. The user may then compare the color/gradient depicted in that data field to a corresponding color/gradient depicted in the legend 710. In some embodiments, different colors may be used to represent different situations. For example, a first color may be used to represent a positive similarity between two items, a second color may be used to represent a negative similarity between two items, a third color may represent no similarity between the two items, and a fourth color may represent an exact match between the two items (e.g., the items are the same item). The colors may be selected so that they are disparate enough to be easily distinguished. For example, in the depiction, items which have a positive similarity are shaded red, items that have a negative similarity are shaded blue, items that have no similarity are shaded gray, and items that are an exact match are shaded green.

In some embodiments, a number of additional information may be presented along with the similarity matrix 702. For example, an identifier 712 associated with a second user in a user pair may be displayed. It should be noted that the first user may be one with respect to which the similarity matrix 702 has been displayed. In some embodiments, an overall similarity score 714 may be depicted which represents the first user's overall level of similarity to the second user. In some embodiments, an overlap value 716 may be presented which represents the overlap in the collection of the first user with the collection of the second user (e.g., a number of items that belong to both collections). The overlap value 716 may be presented as a percentage value or an integer value. For example, in the depicted similarity matrix, the collections share 6 items and a total of 43 items are depicted. Accordingly the overlap value 716 for this similarity matrix may be calculated as approximately 14% (i.e., 6/43).

In some embodiments, a summary representation 718 may be presented which provides a graphical summary of the similarity matrix 702. Summary representation 718 may include multiple segments. In the summary representation 718, the items in the first collection may be depicted in 720 (which includes the first two of the multiple segments) and the items in the second collection may be depicted in 722 (which includes the last two of the multiple segments). It should be noted that the middle segment(s) may represent items that are in both collections (e.g., the overlap). In some embodiments, the overlap segment may include a single value. In the embodiment depicted here, the overlap segment includes two values (e.g., 6|6). It should be noted that in some cases, an item may exist in both collections for the purposes of one collection, but not the other. In those cases, the two values may be used to show this discrepancy.

In some embodiments, the service provider may identify items 724 within the second user's collection that are not within the first user's collection and may be of interest to the first user. In this example, the items 724 may be presented in any suitable manner. For example, the service provider may present a number of images associated with the item (e.g., images stored in relation to an entry in an electronic catalog). In some embodiments, the items 724 selected for presentation may include items having the highest average similarity values within the similarity matrix.

Figure 8:
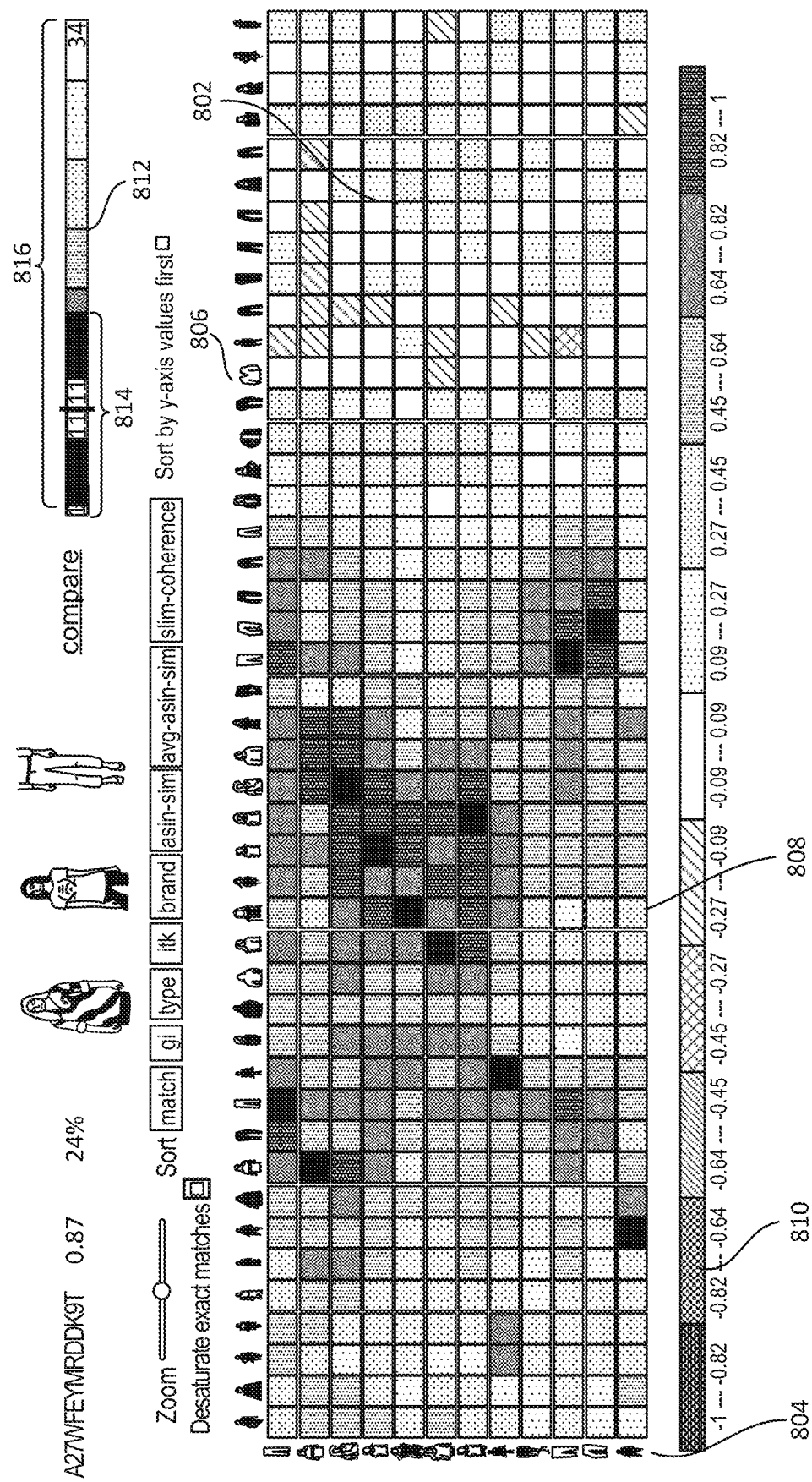
FIG. 8 depicts another illustrative example of a similarity matrix that may be implemented in accordance with at least some embodiments.

FIG. 8 depicts a second illustrative example of a similarity matrix that may be implemented in accordance with at least some embodiments. In order to illustrate features of the disclosure, FIG. 8 is executed in color. The similarity matrix 802 depicted in FIG. 8 is associated with a first user and a second user and includes multiple categories of items (e.g., shirts and pants). In this example similarity matrix, the rows 804 of the similarity matrix represents the clothing items owned by the first user and the columns 806 of the similarity matrix represent the clothing items owned by the second user.

In some embodiments, each data field 808 of the similarity matrix 802 may be associated with a similarity value assigned to an item pair that includes the item of the row 804 and the item of the column 806 that intersects at the data field 808. Based on that similarity value, the data field may be assigned a color and/or gradient associated with a range of values within which that similarity value falls. Similar to the example described above, a legend 810 may be presented along with the similarity matrix that enables a user to quickly determine how similar the system has determined the two items to be.

As can be determined using the legend 810, the similarity matrix 802 represents a user pair in which the users are more similar than those associated with similarity matrix 702 depicted in FIG. 7. This can be quickly determined based the higher degree of similarity for each of the data fields 808 (e.g., similarity matrix 802 include a greater number of red data fields 808). Additionally, the summary representation 812 of similarity matrix 802 includes a larger overlap between segment 814 (which includes the first two of multiple segments) and segment 816 (which includes the last two of multiple segments). For example, similarity matrix 802 depicts an example in which there are 11 items overlapping between the two collections.

Figure 9:
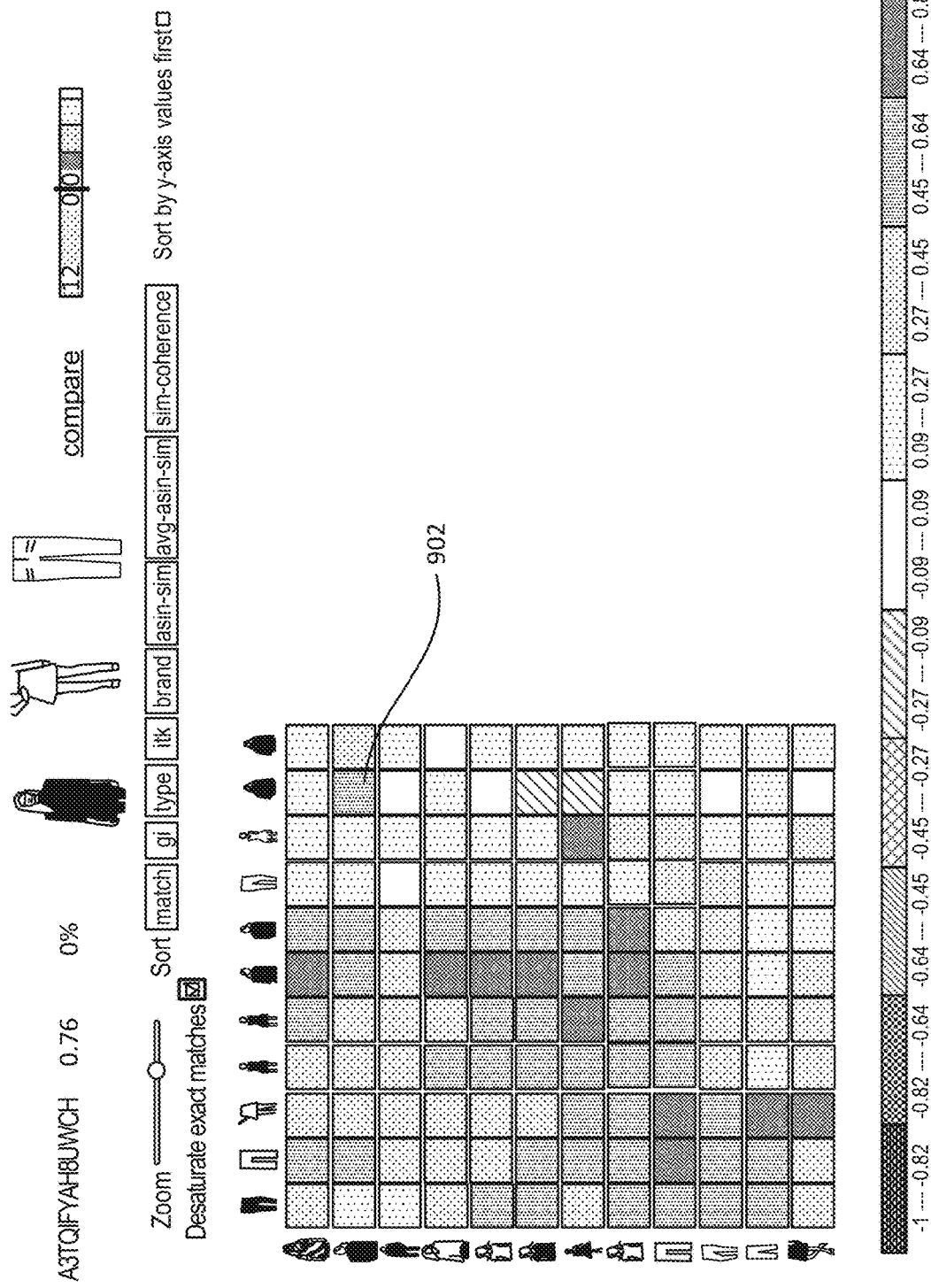
FIG. 9 depicts still another illustrative example of a similarity matrix that may be implemented in accordance with at least some embodiments.

FIG. 9 depicts a third illustrative example of a similarity matrix that may be implemented in accordance with at least some embodiments. Like FIG. 7 and FIG. 8, FIG. 9 is also executed in color to illustrate features of the disclosure. Unlike FIG. 7 and FIG. 8, the similarity matrix 902 depicted illustrates an example of a similarity matrix for a user pair in which the two users may be found to have a high overall similarity score even though the collections associated with those users have no overlap.

Figure 10:
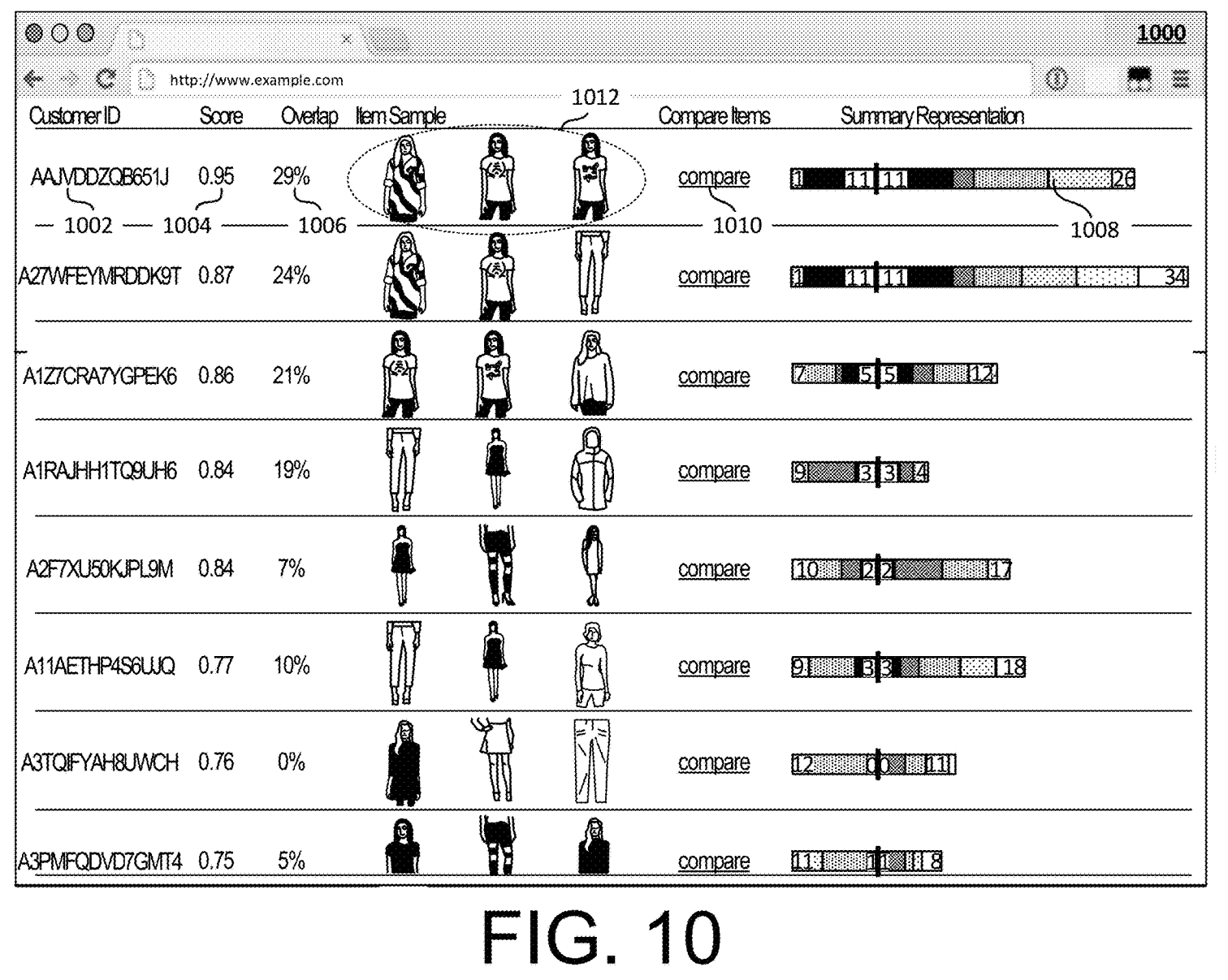

FIG. 10 depicts a graphical user interface that may be presented by a service provider in accordance with at least some embodiments. In some embodiments, GUI 1000 may be presented to a user of a website via a browser application installed upon a user device. In some embodiments, GUI 1000 may be presented to a user of a user device via a mobile application associated with the service provider.

In some embodiments, a user of a user device may access the service provider in order to request user similarity data. The service provider, upon receiving a request for user similarity data with respect to a particular user, may identify a number of user pairs that have been generated using techniques described above. Each of the identified user pairs may be associated with a similarity score, which represents a level of similarity between the particular user and another user in the user pair.

In some embodiments, the service provider may list the user pairs as an ordered list according to a similarity score for that user pair. For each of the listed user pairs, the service provider may list at least one or more of an anonymized user identifier 1002, an indication of the similarity score, an indication of an overlap value (representing an overlap between collections associated with each of the users in the user pair), and a summary representation of a similarity matrix for the user pair. In some embodiments, the list of user pairs may also include an expansion element 1010 that, when selected, enables the user to view additional details related to the user pair (e.g., the similarity matrix).

In some embodiments, the list of user pairs may include an indication of a number of items 1012 which are unique to the collection that is not associated with the particular user. Because the system is able to identify that the items 1012 presented are not owned by the particular user, and because the items 1012 presented are owned by a user that has similar preferences to the particular user, the system is able to identify and present items 1012 that the particular user is likely to be interested in. This provides an advantage over conventional systems in that the user may be provided with an indication of items 1012 that the user may not typically know they are interested in.

Figure 11:
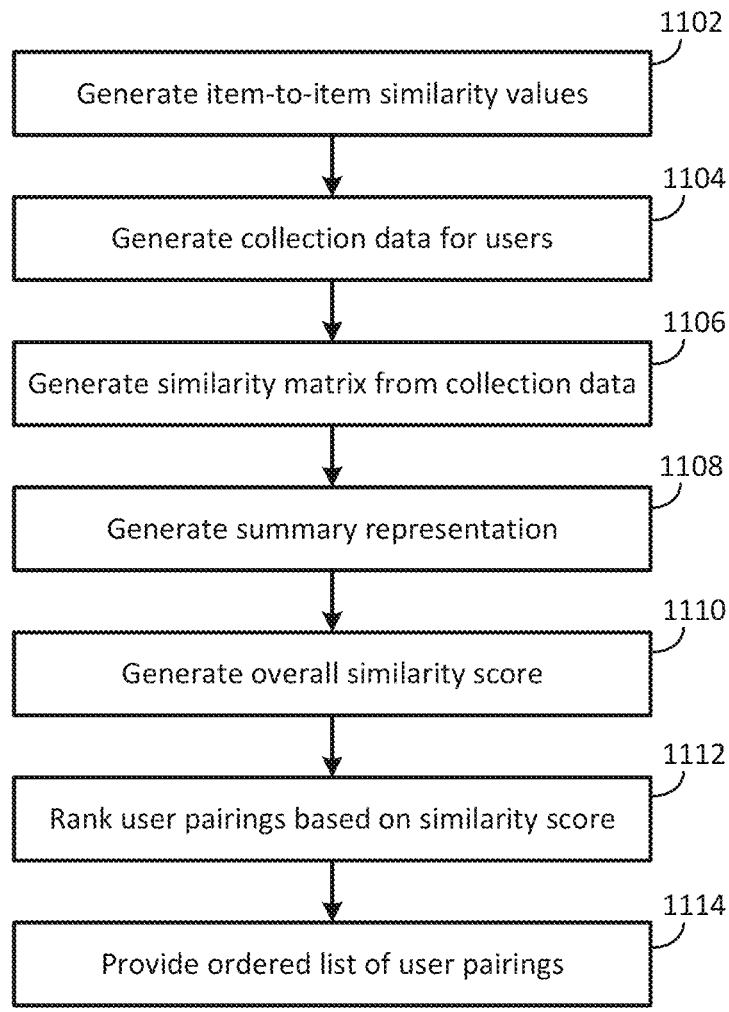
FIG. 11 depicts a flow diagram that depicts a process for providing a list of user pairs to a user ordered by level of similarity.

FIG. 11 depicts a flow diagram that depicts a process for providing a list of user pairs to a user ordered by level of similarity. In accordance with some embodiments, the process 1100 may be performed by the service provider 202 as described with respect to FIG. 2 above.

Process 1100 may begin at 1102, when the service provider generates item-to-item similarity values. In some embodiments, this may involve the use of one or more machine learning algorithms to identify similarities in transaction patterns. The similarity data may be stored in a database maintained by the service provider. Item-to-item similarity values may be calculated for each combination of two items in an item catalog. For example, the service provider may maintain an electronic catalog of items.

At 1104, the service provider may generate collection data for a number of users. In some embodiments, this may involve identifying a number of items previously purchased by the user from the historical transaction data. This process may be repeated for a number of users to generate collection data for each of those users. The collection data may be stored by the service provider in a database with respect to each of the users.

At 1106, the service provider may generate a similarity matrix based on the generated collection data. To do this, the service provider may map the collection data for a first user to rows of the similarity matrix and the collection data for a second user to columns of the similarity matrix. Each data field of the similarity matrix may be associated with an item-to-item similarity value corresponding to the items in the row and column that correspond to that data set.

At 1108, the service provider may generate a summary representation based on the similarity matrix. The summary representation may consist of multiple segments, each of which represent a number of items from one or both of the collections. For example, one segment may represent the items unique to a first collection, a second segment may represent the items included in both collections, and a third segment may represent the items unique to the second collection. Each segment may include a number of the items and/or a color code.

At 1110, the service provider may calculate an overall similarity score for each user pair. In some embodiments, the service provider may calculate a similarity score as a function of the item-to-item similarity values associated with each data field in the similarity matrix. In some embodiments, the similarity score may also account for the overlap between the two collections associated with the similarity matrix.

At 1112, the service provider may rank the user pairs based on their respective similarity scores. In some cases, the service provider may sort the user pairs in accordance with their respective similarity scores. In some embodiments, the service provider may order the user pairs from highest to lowest with respect to similarity score. In some embodiments, the service provider may filter the ordered list to contain a predetermined number of user pairs. For example, the ordered list may include the twenty user pairs having the highest similarity scores. The service provider may then provide the ordered list of user pairs to a user device at 1114.

Embodiments of the disclosure provide for a number of technical advantages over conventional systems. For example, the system enables users to see shopping patterns for users that have similar preferences to them. Users are not only able to see how much alike another user's interests are, but also can discovered items that the user may not have known they would be interested in. Additionally, the summary representation allows one to quickly assess whether two users are actually similar. This allows one to evaluate the efficacy of a machine learning algorithm used to identify item similarity values. This is especially useful for evaluating unsupervised machine learning algorithms.

Figure 12:
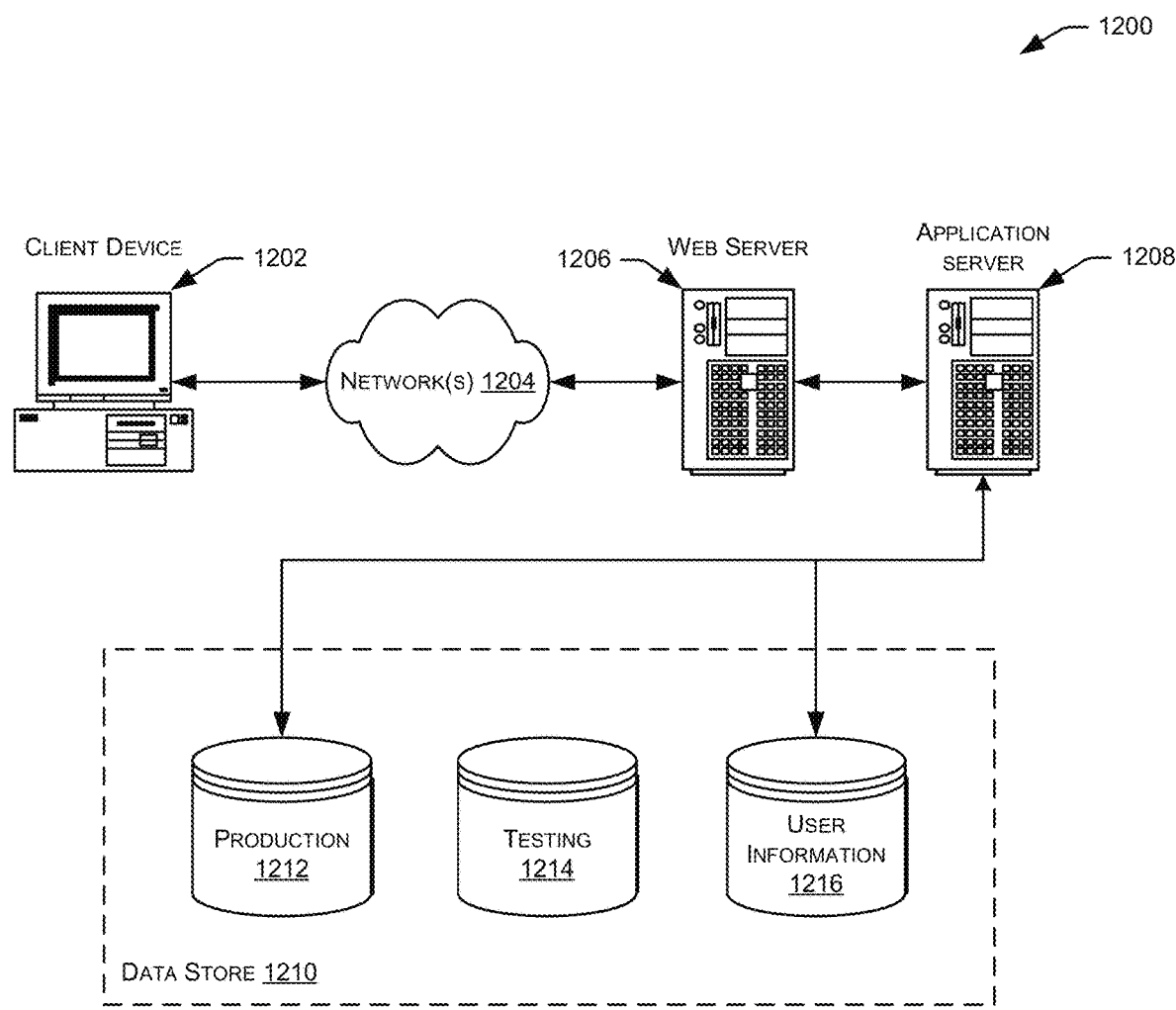
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    determining, based on historical transaction data and utilizing a machine learning model, values representing a level of similarity between items in a set of items;
    generating, from the historical transaction data, a first collection for a first user based on transactions conducted by the first user, the first collection including a first subset of the set of items;
    generating, from the historical transaction data, a second collection for a second user based on transactions conducted by the second user, the second collection including a second subset of the set of items;
    generating a similarity matrix that includes rows associated with the first collection and columns associated with the second collection, wherein data fields of the similarity matrix are respectively associated with the values representing the level of similarity between the items in the set of items;
    determining an overall similarity score that corresponds to a level of similarity between the first user and the second user, the overall similarity score determined based on combining values of data fields of the similarity matrix;
    generating a multi-segmented graphical summary representation of the similarity matrix; and
    providing at least one of (I) the similarity matrix, (II) the overall similarity score, or (III) the multi-segmented graphical summary representation for presentation to a user, the presentation indicating a level of efficacy of the machine learning model.

2. The computer-implemented method of claim 1, wherein the set of items comprise items in an electronic catalog.

3. The computer-implemented method of claim 1, wherein the level of similarity is determined between items in the set of items that belong to a specific category.

4. The computer-implemented method of claim 1, wherein the machine learning model utilizes at least an unsupervised machine learning algorithm to generate the values representing the level of similarity between items in the set of items.

5. The computer-implemented method of claim 1, wherein the multi-segmented graphical summary representation comprises an overlap segment that represents zero or more items common to both the first collection of the first user and the second collection of the second user.

6. A system comprising:
    a processor; and
    a memory including instructions that, when executed with the processor, cause the system to, at least:
        determine, based on historical transaction data and utilizing a machine learning model, values representing a level of similarity between items in a set of items;
        generate, from the historical transaction data, a first subset of the set of items associated with a first user;
        generate, from the historical transaction data, a second subset of the set of items associated with a second user;
        generate a first similarity matrix that includes rows associated with the first subset and columns associated with the second subset, wherein the first similarity matrix includes, the values collectively representing a level of similarity between the first user and the second user;
        generate, from the historical transaction data, at least a third subset of the set of items associated with at least a third user;
        generate a second similarity matrix that includes the rows associated with the first subset and the columns associated with the third subset;
        generate a first similarity score associated with the first similarity matrix and a second similarity score associated with the second similarity matrix, wherein the first similarity matrix is associated with a first user pair between the first user and the second user, wherein the second similarity matrix is associated with a second user pair between the first user and the third user, and wherein the first user pair and the second user pair are ordered based on determining a difference between the first similarity score and the second similarity score; and generate a multi-segmented graphical summary representation of the first similarity matrix and the second similarity matrix that indicates a level of efficacy of the machine learning model.

7. The system of claim 6, wherein individual data fields of the first similarity matrix are associated with the values representing the level of similarity between items.

8. The system of claim 7, wherein the individual data fields of the first similarity matrix are assigned colors based on the values representing the level of similarity between items.

9. The system of claim 6, wherein the multi-segmented graphical summary representation comprises a first segment associated with at least one item unique to a first collection of multiple collection data for a plurality of users and a second segment associated with at least one item unique to a second collection of the multiple collection data.

10. The system of claim 9, wherein the multi-segmented graphical summary representation comprises a third segment associated with an overlap between the first collection and the second collection.

11. The system of claim 9, wherein the multiple collection data is generated for a plurality of users based from purchase history associated with individual users of the plurality of users.

12. The system of claim 11, wherein the system is operated by an electronic retailer and the purchase history comprises information on transactions conducted with respect to the electronic retailer.

13. A non-transitory computer readable medium storing specific computer-executable instructions that, when executed by a processor, cause a computer system to at least:
    determine, based on historical transaction data and utilizing a machine learning model, item-to-item similarity values for items in a set of items;
    generate, from the historical transaction data, a first subset of the set of items associated with a first user;
    generate, from the historical transaction data, a second subset of the set of items associated with a second user;
    generate a first similarity matrix that includes rows associated with the first subset and columns associated with the second subset, wherein the first similarity matrix includes the item-to-item similarity values that collectively indicate a level of similarity between the first user and the second user;
    generate, from the historical transaction data, at least a third subset of the set of items associated with at least a third user;
    generate a second similarity matrix that includes the rows associated with the first subset and the columns associated with the third subset;
    generate a first similarity score associated with the first similarity matrix and a second similarity score associated with the second similarity matrix, wherein the first similarity matrix is associated with a first user pair between the first user and the second user, wherein the second similarity matrix is associated with a second user pair between the first user and the third user, and wherein the first user pair and the second user pair are ordered based on determining a difference between the first similarity score and the second similarity score; and
    generate a summary representation of the first similarity matrix and the second similarity matrix that indicates a level of efficacy of the machine learning model.

14. The computer readable medium of claim 13, wherein the instructions further cause the computer system to display the first similarity matrix and the second similarity matrix to the first user via a user device based on the ordering.

15. The computer readable medium of claim 14, wherein the user device is caused to display at least some items of the third subset of the set of items that are not included in the first subset of the set of items via the user device.

16. The computer readable medium of claim 13, wherein the summary representation of the first similarity matrix and the second similarity matrix is provided to a user device within a list that includes a plurality of summary representations.

* * * * *